United States Patent [19]
Roth

[11] 3,958,872
[45] May 25, 1976

[54] MOTION PICTURE CAMERA WITH ELECTROMAGNETICALLY ACTUATED RELEASE

[75] Inventor: Johann Roth, Schwabhausen, Germany

[73] Assignee: Braun Aktiengesellschaft, Frankfurt am Main, Germany

[22] Filed: Oct. 7, 1974

[21] Appl. No.: 512,991

[30] Foreign Application Priority Data
Oct. 10, 1973   Germany............................ 2350738

[52] U.S. Cl................................. 352/92; 352/121; 352/169; 352/174
[51] Int. Cl.²................... G03B 21/50; G03B 17/46
[58] Field of Search ............ 352/121, 92, 137, 169, 352/174, 176, 177

[56] References Cited
UNITED STATES PATENTS
| | | | |
|---|---|---|---|
| 3,432,228 | 3/1969 | Hellmund | 352/92 X |
| 3,809,466 | 5/1974 | Kobayashi | 352/121 |

Primary Examiner—Monroe H. Hayes
Attorney, Agent, or Firm—Ernest F. Marmorek

[57] ABSTRACT

A motion picture camera of the type having an electrically magnetically operated release. The electric circuit includes a drive circuit and a release circuit as well as a signal circuit connected between the drive circuit and the release circuit. The drive circuit includes an electric motor for driving the film and a normally open drive switch all connected in series with the current source. The release circuit includes a release magnet having an armature and an exciting coil. The armature operates a normally open release switch for closing it upon energization of the exciting coil. The release switch and exciter coil are connected in series with the source. Finally, the signal circuit includes an electro-optic indicator such as an incandescent lamp or light-emitting diode connected in parallel with the exciter coil of the magnet and in series with the motor. As a result, the indicator lights up upon closing of the release switch to produce a light mark on the film before the motor begins to drive the film.

4 Claims, 2 Drawing Figures

MOTION PICTURE CAMERA WITH ELECTROMAGNETICALLY ACTUATED RELEASE

BACKGROUND OF THE INVENTION

This invention relates generally to motion picture cameras and particularly relates to such a camera having an electromagnetically operated release.

Such motion picture cameras include a release magnet having an armature which normally blocks the camera drive and which maintains the drive current of the camera in the open position.

When the release of the camera is actuated, the release magnet is excited so that its armature is attracted. This in turn mechanically releases the camera drive and closes the drive circuit of the camera by means of a switch disposed in the path of the armature.

This electromagnetic release has the advantage that it can be controlled for the purpose of taking individual pictures as well as so-called time lapse pictures. In other words, the release can be controlled to take individual pictures in preselected time intervals in a relatively simple manner by electromagnetic means or better even by an electronic pulse generator. In addition, by employing only a switch for the remote control of a cable it can be remotely controlled.

It is accordingly an object of the present invention to provide an electromagnetically operated release arrangement for a motion picture camera which serves the additional purpose to mark or flag the beginning of a scene.

SUMMARY OF THE INVENTION

This object is obtained in accordance with the present invention by providing an electro-optic indicator which is connected between the release circuit and the drive circuit of the camera. The electro-optic indicator is connected in parallel to the release magnet and in series with the drive motor. When the indicator lights up at the beginning of the release cycle it causes a light mark or flag on the portion of the film to be exposed just before the film begins to move.

By means of the invention a marking or flagging of the beginning of each scene is made possible with extremely simple means, that is solely by the ingenuous incorporation of the indicator element into the circuit of the camera. This in turn considerably simplifies the further treatment of the developed film, that is the cutting or splicing or the synchronizing of picture and sound.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

DESCRIPTION OF THE PREFERRED EMBODIMENT

Figure 1:
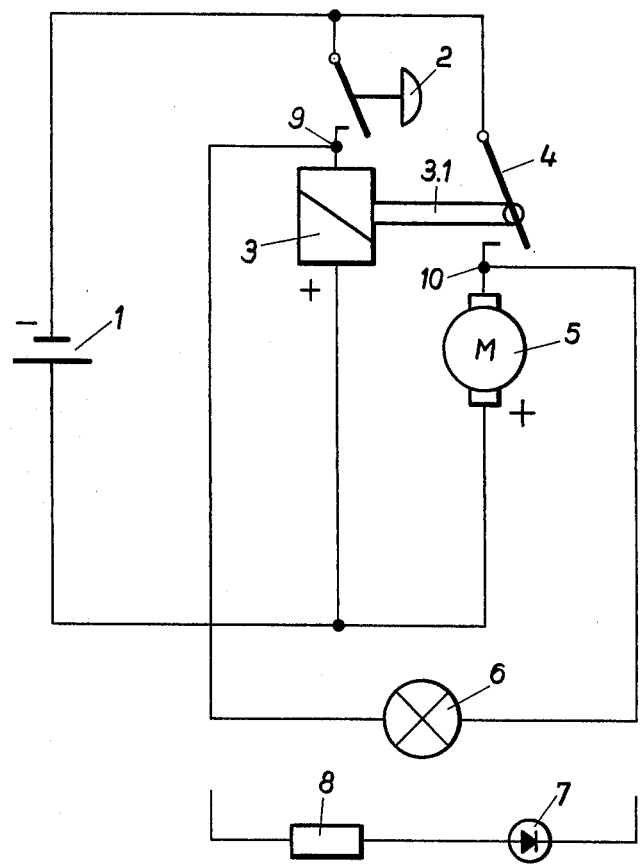
FIG. 1 is a circuit diagram of the release circuit, the drive circuit and the signal circuit of the motion picture camera of the invention.

As shown in FIG. 1, the release circuit includes a current source 1 which may, for example, be a battery as shown, the release 2 which may consist of a switching key and the release magnet 3 which is provided with an exciting coil. Hence the magnet may be considered a switch or relay because it serves the purpose to close the switch 4.

The drive circuit also includes the current source as well as the switch 4 which is operated by the release magnet 3 by means of its armature 3.1 as well as the drive motor 5 of the camera.

If it is desired to operate the motion picture camera the release 2 is depressed to close the release circuit. Now the exciter coil of the release magnet 3 is fed by the current source 1 to build up a magnetic field which is necessary for attracting the armature 3.1.

Up to this instant of time the current of the source 1 flows through the junction point 9 which is disposed ahead of the exciter coil of the release magnet 3 and through the branch circuit of the indicator lamp 6 or the light-emitting diode 7 and resistor 8 which alternately form the indicator element as well as the exciter winding of the drive motor 5 connected in series therewith. The magnitude of the current is limited by the resistance of the incandescent lamp 6 or by the light-emitting diode 7 with its preceding resistor 8. This current magnitude is below the nominal value of the motor 5 so that the motor does not run.

Figure 2:
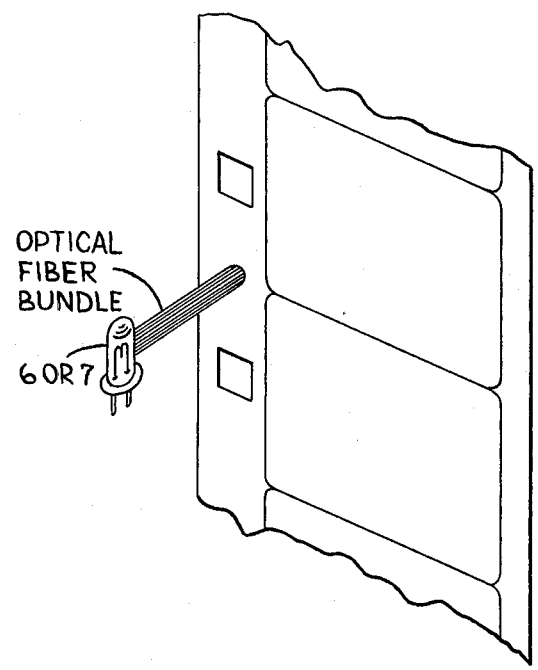
FIG. 2 is a diagram showing a fiber optic bundle for conducting light to the outside of the movie film.

The lighting up of the indicator element 6 or 7 is now transmitted onto the still stationary film strip outside of the still closed picture window by its closure element. This may take place by directly illuminating in an optical manner of the light of the indicator or alternatively by means of optical fibers as shown in FIG. 2. Preferably, the film is illuminated outside of the picture frame of the film. In this manner the film of the camera which is still stationary is briefly illuminated within the range of the desired portion of the film by the light impulse of the indicator element.

The duration of the illumination corresponds to the period of time when the indicator element 6 or 7 emits light.

The indicator is extinguished as soon as the release magnet 3 by means of the switch 4 closes the circuit of the drive motor 5. At this instant the signal current which branches off at the junction point 9 from the release circuit and at the junction point 10 from the drive circuit is short circuited because the release and drive circuits are connected in parallel. As a result, the current flow through the indicator element 6 or 7 is interrupted.

The lighting up of the indicator element accordingly takes place only for a short duration while the film is still stationary and therefore fulfills the aim to provide a start signal or flag on the film immediately before the beginning of the next scene.

What is claimed is:

1. A motion picture camera for use in connection with a motion picture film, and comprising:
   a. a drive circuit including a current source; an electric motor adapted for driving the film of the camera; and a normally open drive switch, said source, said motor and said drive switch being connected in series;

b. a release circuit including: a release magnet having an armature and an exciter coil; a normally open release switch operable to energize said exciter coil; said armature being coupled to said drive switch for closing it upon energization of said exciter coil, said source, said release switch and said magnet exciter coil being connected in series; and c. a signal circuit connected between said drive circuit and said release circuit and including: an electro-optic indicator connected in parallel with said magnet exciter coil and in series with said motor, whereby said indicator lights up upon closing of said release switch and is adapted to produce a light mark on the film of the camera before the motor begins to drive the film.

2. A motion picture camera as defined in claim 1 wherein said indicator is an incandescent lamp.

3. A motion picture camera as defined in claim 1 wherein said indicator is a light-emitting diode.

4. A camera as defined in claim 1 wherein means are provided for directing the light from said indicator onto an array outside of the picture frame of the film to be illuminated.

* * * * *